United States Patent [19]

Tarsia

[11] 4,432,636
[45] Feb. 21, 1984

[54] ILLUMINATION APPARATUS

[75] Inventor: Giuseppe Tarsia, Valley Stream, N.Y.

[73] Assignee: Berkey Photo, Inc., White Plains, N.Y.

[21] Appl. No.: 349,773

[22] Filed: Feb. 18, 1982

[51] Int. Cl.³ .................... G03B 27/72; G03B 27/76
[52] U.S. Cl. ........................................ 355/35; 355/18
[58] Field of Search ................... 355/67, 70, 71, 1, 18, 355/37, 35; 250/226

[56] References Cited

U.S. PATENT DOCUMENTS

| | | | |
|---|---|---|---|
| 2,455,142 | 11/1948 | Simmon et al. | 355/63 |
| 3,028,483 | 4/1962 | Simmon | 355/71 |
| 3,351,766 | 11/1967 | Weisglass | 250/226 |
| 3,488,117 | 1/1970 | Weisglass | 355/37 |
| 3,565,524 | 2/1971 | Pabst et al. | 355/1 |
| 3,677,636 | 7/1972 | Stein | 355/18 |
| 3,684,371 | 8/1972 | Weisglass et al. | 355/71 |
| 4,009,383 | 2/1977 | Beier | 355/67 X |
| 4,023,903 | 5/1977 | Scheib | 355/71 |
| 4,050,813 | 9/1977 | Pramstraller | 355/67 |
| 4,110,036 | 8/1978 | Guillaume | 355/67 X |
| 4,189,229 | 2/1980 | Guillaume | 355/67 |

Primary Examiner—Richard A. Wintercorn
Attorney, Agent, or Firm—Neuman, Williams, Anderson & Olson

[57] ABSTRACT

In a photographic enlarger apparatus having a diffusion light head and utilizing interchangeable and differently sized light mixing chambers for transmission of light through negatives of various sizes, a light source positioning means is provided. The positioning means moves the light source so that it cooperates with a plurality of mixing chambers, each having a light exit sized to conform to a given transparency size, in order to minimize the length of the optical path. The positioning means also maintains the light beam in optical alignment with the light inlet of a selected light mixing chamber. Utilizing the present invention, a common optical axis may be maintained through all negatives and improved light image characteristics are obtained by reduction of the length of the optical path from the light source to the transparency.

14 Claims, 3 Drawing Figures

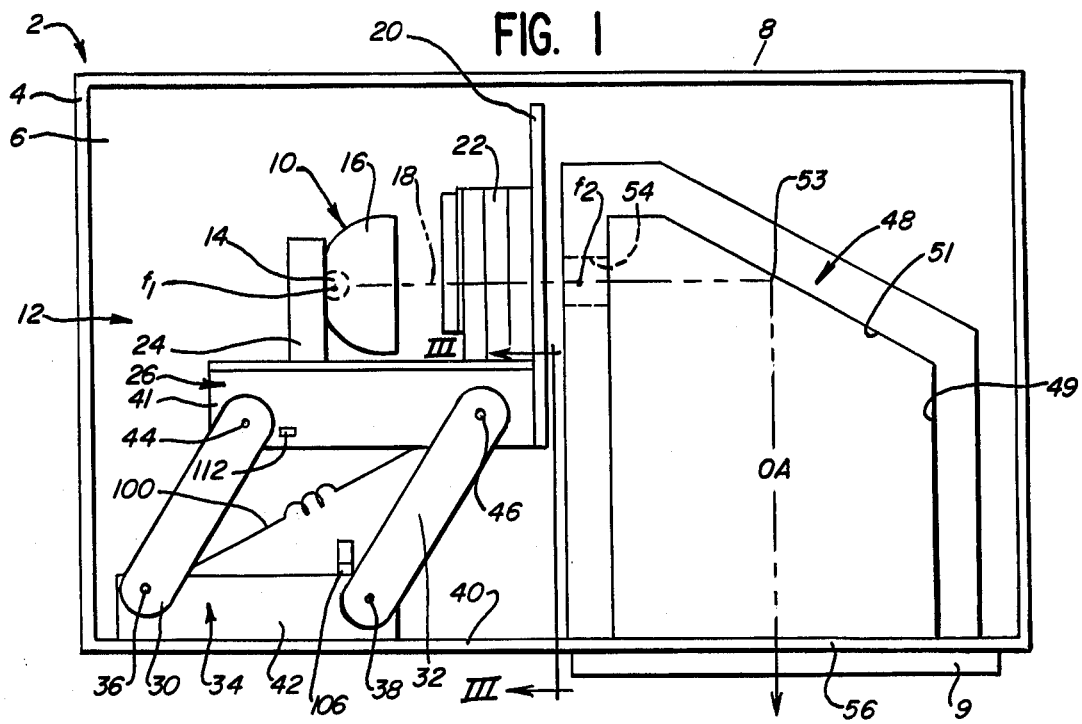
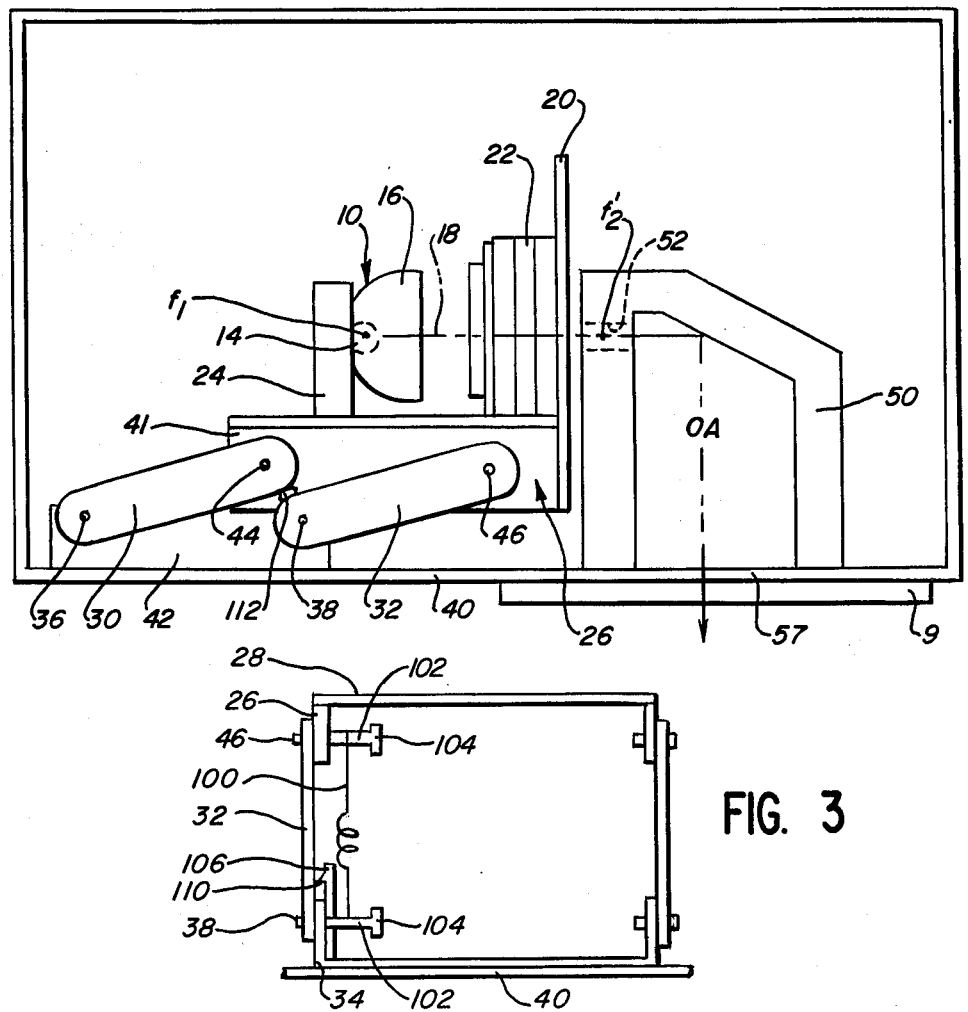

ILLUMINATION APPARATUS

BACKGROUND OF THE INVENTION

This invention relates to a diffusion-type light head for use as a part of a photographic enlarger for the making of photographic prints. More specifically, it utilizes interchangeable light mixing chambers and a light source positioning means adapted to maintain the light source close to the negative or mixing chamber to maximize the light flux through the negative by reducing the length of the optical path, yet obtain optimum light mixing and achieve relatively uniform flux at all exit locations.

Diffusion light heads and light mixing chambers, particularly suited for use with photographic enlargers and projection devices, are known in the art. A white light source, i.e. one emitting a full spectrum of colors, is mounted at one focal point of an ellipsoidal reflector. A number of color correction filters are mounted between the first and second focal points of the reflector for selective partial interference with the light beam to adjust its chromaticity as necessary to provide the desired print. A mixing chamber is disposed with an inlet at the second focal point of the reflector to accept the color corrected light. Because color correction is accomplished by selected partial insertion of one or more filters into the white light, only portions of the beam are colored, and the colored portions have a lower flux (luminous energy per unit area) due to the reflection or absorption of light by the colored filters. Thus, a mixing chamber is used to scramble the light admitted thereinto to provide a homogeneous color light beam of uniform flux at the exit port. A negative or other transparency is usually placed immediately adjacent the exit port to create an image for printing or projection.

It is desireable to maximize the amount of light flux incident upon a negative in order to decrease printing times. This reduces labor costs, maximizes the efficiency of the enlarging equipment, and reduces the "on" time of the enlarger lamp. In the past, this has been accomplished by utilizing interchangeable light mixing chambers, each having exit ports sized to accommodate a transparency of a given size. Light flux was thus increased by reducing the area over which the light was spread. An example of an enlarger utilizing different size interchangeable light mixing chambers and a fixed light source is Weisglass U.S. Pat. No. 3,684,371, commonly owned with the subject application. However, as recognized by the laws of physics, the intensity of the light varies inversely as the square of the distance from the source. And, merely reducing the area of the exit port of the mixing chamber without lessening the distance from the light source to the negative does not increase the light intensity at the exit port.

SUMMARY OF THE PRESENT INVENTION

Accordingly, it is an object of the present invention to provide an improved illumination apparatus for photographic printers and enlargers that increases the light flux through a transparency by increasing light intensity and decreasing the area over which the light is spread, and also provides a light beam of homogeneous chromaticity.

It is another object of the present invention to provide an improved illumination apparatus wherein a plurality of interchangeable light mixing chambers is each efficiently configured with a light exit correspondingly shaped to the transparency to be printed, and wherein the light source may be conveniently positioned in optical alignment with the light inlet of a selected mixing chamber.

It is another object of the present invention to increase the luminous energy per unit area passing through smaller transparencies which require higher magnification, and to thereby significantly reduce exposure times.

These and other objects of the invention will be apparent hereinafter from the specification which describes the best mode of practicing the invention as currently known, its use and operation, and a preferred embodiment. Reference should also be made to the drawings, which constitute a part of the disclosure, and the subject matter claimed.

Generally, the objects of the present invention are accomplished in an image projection system having a light source means contained in a first portion of a light sealed housing, a light mixing chamber selected from a plurality of differently sized and interchangeable mixing chambers for insertion into a second housing portion, and a negative carrier below the light mixing chamber forming a third portion of the light sealed housing. Each light mixing chamber has a light inlet for receiving a beam of light from the light source, and a light exit correspondingly sized to the film transparency to be printed or enlarged. The image projection system features a light positioning means for positioning the light source in optical alignment with said light inlet of a selected light mixing chamber and may include latch means to releasably secure the light source positioning means in selected position.

In a preferred embodiment of the present invention, the light source positioning means comprises a parallelogram movement for maintaining the light source means in optical alignment with said light inlet. It will be appreciated that additional means may be employed to position the light source in relation to the respective light mixing chamber.

BRIEF DESCRIPTION OF THE DRAWINGS

For a more complete understanding of this invention, reference will now be made to the drawings wherein:

FIG. 1 is a side plan view of the illumination apparatus of the present invention with one side of the housing removed to show the light source positioning means in a first position for cooperation with a light mixing chamber for relatively large negatives.

FIG. 2 is a side plan view of the illumination apparatus of FIG. 1 showing the light source positioning means in a second position for cooperation with a light mixing chamber for relatively small negatives.

FIG. 3 is a section view of the illumination apparatus of the present invention taken substantially along line III—III of FIG. 1 to further illustrate the light source positioning means.

DESCRIPTION OF THE PREFERRED EMBODIMENT

Referring now to FIG. 1, an illumination apparatus 2 in accordance with the present invention is shown to include a light sealed housing 4 which may be made of sheet metal or plastic, or any other suitable opaque material. The housing generally includes three portions, a lamp containing portion 6, a mixing chamber portion 8, and a negative carrier portion 9. It is necessary that there be optical communication from one portion to the next. Each portion need not be physically partioned. Housing 4 is provided with door means, not shown, to permit access to the lamp containing portion 6 and the mixing chamber portion 8. Conventional means may be used to provide access to and to position a transparency or negative in the negative carrier portion 9.

Within portion 8 of housing 4, a light source means 10 is mounted on a positioning means 12, shown in its upper position. As illustrated in FIG. 2, and as will be discussed more fully hereinafter, light source means 10 may be shifted to its lower position by shifting positioning means 12. Light source means 10 typically includes a lamp 14, shown in hidden lines, positioned at one focus $f_1$ of an ellipsoidal reflector 16 for producing a concentrated light beam 18 having a full spectrum of colors. The lamp is usually electrically powered. The light beam converges at a second focus $f_2$, preferably disposed at the inlet 54 of a mixing chamber 48, which will be described in more detail later. For convenience, the light beam 18 has been illustrated as a single light ray to locate the optical axis of the apparatus.

An apertured partition 20 is mounted between the lamp 14 and mixing chamber portion 8, and it permits communication of light beam 18 to the selected mixing chamber 48. Interposed between lamp 14 and partition 20 are one or more light filters 22 which may be pivotally mounted and either manually or electrically selectively positioned within light beam 18 to produce a desired color blending of the beam before it enters the mixing chamber 48.

Lamp 14 and reflector 16 are attached to a platform 26, as by a support member 24. One or more light filter units 22 and the apertured partition 20 are also mounted on platform 26 to collectively provide a light unit. Platform 26 is shown to have a generally rectangular cross section and a generally flat receiving surface upon which the various components of light source means 10 may be mounted.

A corresponding base member 34 is disposed near the inside bottom rear of housing 4 and may be a separate part or it may be an orthogonal extension of the bottom wall 40 of housing 4. Support arm 30 is attached to the rear end of side portion 41 of platform 26 at pivot 44 and a like support arm 32 is attached to the forward end side portion 42 of platform 26 at pivot 46. Similarly, support arms 30, 32 are attached to the rear and forward ends of side portion 42 of base member 34 at pivots 36 and 38, respectively. The four pivots 36, 38, 44 and 46 form a parallelogram, and the parallelogram movement created thereby permits an operator to position light source means 10 at different heights within the lamp containing portion 6. This movement maintains the light beam parallel to the bottom wall 40 of the housing, regardless of the platform position, and moves the second focal point $f_2$ along an arc defined by movement of the platform without shifting light beam 18 from its horizontal axis. For additional stability, a second parallelogram movement may be constructed on opposite sides of platform 26 and the base member 34, as shown in FIG. 3.

Positioning means 12 can be biased by a spring toward the upper position and retained in the lower position by a latch or detent means such as a deformable clip for operative engagement with a receiving slot. Referring to FIGS. 1 and 3, and using like numbers to assist in understanding the invention by denoting similar parts throughout the several views, a spring 100 is shown connected between pivots 36 and 46 on the inside of base member 34 and platform 26, respectively, for urging platform 26 to an uppermost position. Spring 100 is retained at either end by a shaft 102 with a head 104 thereon to prevent spring 100 from sliding off shaft 102. A deformable clip 106 is rigidly affixed to the side of base member 34 and projects vertically upward slightly above the height of base member 34. Clip 106 also has a catch member 110 rigidly attached thereto and depending at a substantially right angle toward platform side portion 41. When platform 26 is in its lower position catch member 110 engages receiving slot 112 in side portion 42. Platform 26 is released to its upper position by overcoming the clip holding force as by pulling clip 106 away from platform 26 and thereby disengaging catch member 110 from receiving slot 112. It will be appreciated that other spring bias and latch means may be employed to retain platform 26 at any desired position.

The apparatus for coloring the light beam and the types of filters used do not form a part of this invention, but they usually color only a portion of the light beam, resulting in discrete filtered and unfiltered portions thereof. As noted earlier, such filtering also reduces the flux of that portion of the light beam that passes through the one or more filters. Since this light beam, variegated as to the color and flux, would be unsuitable for direct use with variable contrast or color photosensitive materials, it is necessary to mix the beam to provide homogeneous light, as will be described.

Interchangeably positioned within the mixing chamber portion 8 is one of a plurality of light mixing chambers. A mixing chamber 48, such as might be used with a 4×5 inch transparency, is illustrated. A smaller light mixing chamber 50, such as might be used with a 35 mm negative is shown in FIG. 3. The light mixing chambers are generally light tight compartments having a relatively small inlets 54, 52 and outlets 56, 57 sized and configured to correspond to the image area of a photographic negative or other transparency. It is desireable to position the inlets 54, 52 at the second foci $f_2$, $f_2'$ of the ellipsoidal reflector so that substantially all of the light from the light source means 10 enters the chambers 48, 50. In addition, when so positioned the inlet may be small, minimizing the amount of light reflected back out of the chamber through the inlet. The interior of each chamber typically has textured white walls with a matte finish to reflect and diffuse the entering light. They are so oriented as to direct the entering light beam 18 towards the exits 56, 57 along an optical axis OA. For instance, as illustrated for mixing chamber 48, it may be substantially rectangular with flat inner wall surfaces 49 and a flat ceiling surface 51 sloped downwardly. The inlet 48 is located to direct light onto the ceiling 51 to reflect it down to the light exit 56, with the ceiling being directly over the exit. To assist in mixing, the textured walls diffuse the incident light, and to improve efficiency it is preferred to place the center of the ceiling 53 in alignment with the optical axis OA. A negative is placed in the negative carrier portion 9, with its center also usally aligned along the optical axis OA.

The cross sectional area of the mixing chamber is substantially determined by the area of its corresponding negative. The height of the chamber will depend upon the coloration techniques utilized and the amount of mixing necessary to obtain a light output of homogeneous chromaticity. Optimum heights may be easily determined by experimentation, with the aid of a standard color analyzer. To minimize the distance from the light source 10 to the negative portion 9 in the illustrated embodiment, the light source is located as close as possible to the mixing chamber inlet. As a result, the light flux will be relatively higher due to the shortened distance from the light source to the negative and the selection of an optimally sized mixing chamber. The exact position and proximity will depend upon the reflector configuration and space requirements for filters 22. It is to be understood that light sources with different configuration reflectors and different, or absent, filter means is included within the scope of the present invention.

For printing a smaller negative, such as a 35 millimeter negative, a mixing chamber having a correspondingly smaller cross sectional area is used and the light source is moved to its lower position. For example, the larger mixing chamber 48 is removed to clear the mixing chamber portion 8 of the housing. This also allows access to the light means 12, which would be grasped and pulled forward and down, overcoming the bias of spring 100. When the platform 26 is seated against the base member 34, the catch 110 of latch 106 seats into slot 112 on the side of the platform 26 to retain it in position. A smaller mixing chamber 50 is now inserted into the mixing chamber portion 8. As before, the chamber inlet 52 is positioned at the second focus of the elliptical reflector, now located at $f_2'$, and the chamber outlet 57, sized to correspond to the smaller negative, is superposed the negative carrier portion 9. For convenience in use the optical axis of the larger mixing chamber coincides with that of the smaller one. And, once again, the height of the mixing chamber is determined to minimize the distance from the light source to the negative yet provide a homogeneous light output.

Light is mixed in the chamber and exits as before, except the flux is much higher. Not only is it increased by the resulting decrease in area of the mixing chamber exit, it is further increased due to the shortening of the distance from the source to the negative, which increases the light intensity.

The utility of the invention is not limited to light heads or the two mixing chambers herein described. For example, the adjustable light source disclosed may be used where the light exits of the mixing chambers do not coincide with a single optical axis. Moreover, the light source is not limited to two positions. Any number of positions may be used with any number of mixing chambers suitably proportioned.

It is believed that the embodiments herein illustrated and described accomplish all of the above enumerated objects and have made apparent a number of modifications which can be made in the invention disclosed by those having the benefit of the foregoing teachings without departing from the spirit and scope of these principles. Accordingly, it is intended that this invention be limited only by the scope of the appended claims.

What is claimed is:

1. An illumination apparatus for use in an image projection system comprising:
    a light source means;
    a light sealed housing having a first portion for containing said light source means, a second portion for containing a light mixing means, and a third portion for containing a transparency;
    a light mixing chamber selected for insertion into said housing second portion from a plurality of differently sized and interchangeable mixing chambers, said light mixing chamber having a light inlet at one side thereof and a light exit at another side thereof; and
    light source positioning means comprising a parallelogram movement for maintaining said light source means at a selected location in optical alignment with said light inlet of a selected light mixing chamber, whereby increased light flux through said transparency is obtained.

2. The illumination apparatus of claim 1 wherein said light source means is positioned at a minimum distance from said light inlet.

3. The illumination apparatus of claim 1 or 2 wherein said light source means comprises:
    a lamp disposed within said housing first portion; and
    a reflector means associated with said lamp and providing a concentrated beam of light near said light inlet of a selected light mixing chamber.

4. The multi-position illumination apparatus of claim 3 wherein said reflector is of ellipsoidal configuration.

5. The illumination apparatus of claim 3 wherein said light source means includes one or more filter units moveable into or out of said optical path.

6. The illumination apparatus of claim 1 or 2 wherein said housing third portion comprises a transparency carrier positioned to receive light transmitted through said light exit of a selected mixing chamber.

7. The illumination apparatus of claim 1 or 2 wherein the light exit of each mixing chamber is of approximately the same size as the transparency with which it is to be used.

8. The illumination apparatus of claim 1 or 2 wherein the length of the optical path in each mixing chamber from said light inlet to said light exit is of minimum length to provide light of substantially homogeneous chromaticity and flux at all positions at said exit.

9. The illumination apparatus of claim 1 or 2 wherein the optical axis of said transparency portion is fixed and the optical axis of the light exit for each of said mixing chambers coincides therewith.

10. The illumination apparatus of claim 1 or 2 wherein said light source positioning means is spring biased to a predetermined position.

11. The illumination apparatus of claim 1 or 2 wherein said light source positioning means comprises:
    a base member;
    a platform superposed on said base member, said platform supporting said light source means;
    a pair of support arms each having one end operatively connected to said base member and the other end connected to said platform. said support arms, base member and platform forming a parallelogram, whereby the optical axis of said light source means in one position remains substantially parallel to the optical axis of said light source means in another position.

12. The illumination apparatus of claim 1 or 2 further comprising latch means to releasably secure said light source positioning means in a selected position.

13. The illumination apparatus of claim 12 wherein said latch means comprises a deformable clip for operative engagement with a receiving slot.

14. An illumination apparatus for use in an image projection system comprising:
    a light sealed housing having a lamp containing portion and light mixing chamber portion;
    a lamp disposed within said lamp containing portion;

an ellipsoidal reflector associated with said lamp and providing a concentrated beam of light, said lamp situated at the first focus of said ellipsoidal reflector and said light beam concentrating at the second focus thereof;

a lamp holder on which said lamp and ellipsoidal reflector associated therewith are mounted;

a light mixing chamber selected for insertion into said housing mixing chamber portion from a plurality of differently sized and interchangeable mixing chambers, said light mixing chamber having a light inlet at one side thereof adjacent said lamp containing portion for receiving said concentrated beam of light and a light exit at another side thereof; and a parallelogram movement for moving said lamp holder and placing said second focus concentrated light beam near said light inlet of a selected light mixing chamber.

* * * * *